(12) United States Patent
Sugaya et al.

(10) Patent No.: US 12,111,550 B2
(45) Date of Patent: Oct. 8, 2024

(54) ACTIVE MATRIX SUBSTRATE, LIQUID CRYSTAL DISPLAY DEVICE, SELF-LUMINOUS DISPLAY DEVICE, AND IMAGING DEVICE

(71) Applicant: TIANMA JAPAN, LTD., Kanagawa (JP)

(72) Inventors: Hiroki Sugaya, Kanagawa (JP); Fuminori Tamura, Kanagawa (JP); Takayuki Ishino, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 18/466,563

(22) Filed: Sep. 13, 2023

(65) Prior Publication Data

US 2024/0094586 A1   Mar. 21, 2024

(30) Foreign Application Priority Data

Sep. 20, 2022   (JP) ................. 2022-148897

(51) Int. Cl.
*G02F 1/1345*   (2006.01)
*G02F 1/1362*   (2006.01)
*G02F 1/1368*   (2006.01)

(52) U.S. Cl.
CPC .... *G02F 1/136286* (2013.01); *G02F 1/13458* (2013.01); *G02F 1/1368* (2013.01); *G02F 1/13452* (2013.01)

(58) Field of Classification Search
CPC .. G02F 1/1343; G02F 1/1345; G02F 1/13452; G02F 1/13454; G02F 1/13458; G02F 1/1362; G02F 1/1368
See application file for complete search history.

(56) References Cited

U.S. PATENT DOCUMENTS

| | | | |
|---|---|---|---|
| 2003/0086048 A1* | 5/2003 | Ukita | G02F 1/1345 349/149 |
| 2005/0194657 A1* | 9/2005 | Koide | G02F 1/136204 257/499 |
| 2011/0006780 A1* | 1/2011 | Tanimoto | G02F 1/1345 345/55 |
| 2016/0088726 A1 | 3/2016 | Jeon | |
| 2016/0360625 A1 | 12/2016 | Ogasawara et al. | |
| 2018/0014406 A1 | 1/2018 | Yang et al. | |
| 2019/0162994 A1* | 5/2019 | Fujikawa | G02F 1/133602 |
| 2020/0243592 A1* | 7/2020 | Takahashi | H01L 27/14663 |
| 2020/0278587 A1 | 9/2020 | Fukami et al. | |
| 2020/0363687 A1* | 11/2020 | Tanabe | H05K 1/189 |
| 2021/0390886 A1 | 12/2021 | Liu et al. | |

FOREIGN PATENT DOCUMENTS

| | | |
|---|---|---|
| JP | 2018-503128 A | 2/2018 |
| JP | 2020-160393 A | 10/2020 |

* cited by examiner

*Primary Examiner* — Thoi V Duong
(74) *Attorney, Agent, or Firm* — Sughrue Mion, PLLC

(57) ABSTRACT

An active matrix substrate includes a plurality of pixel electrodes; a plurality of switching elements that connect to each of the plurality of pixel electrodes; a plurality of pixel lines that connect to each of the plurality of switching elements; a plurality of connection lines that connect to each of the plurality of pixel lines; and a plurality of terminals that connect to each of the plurality of connection lines. An arrangement direction of the pixel lines and an arrangement direction of the terminals differ.

9 Claims, 12 Drawing Sheets

ACTIVE MATRIX SUBSTRATE, LIQUID CRYSTAL DISPLAY DEVICE, SELF-LUMINOUS DISPLAY DEVICE, AND IMAGING DEVICE

CROSS-REFERENCE TO RELATED APPLICATIONS

This application claims the benefit of Japanese Patent Application No. 2022-148897, filed on Sep. 20, 2022, the entire disclosure of which is incorporated by reference herein.

FIELD OF THE INVENTION

The present disclosure relates generally to an active matrix substrate, a liquid crystal display device, a self-luminous display device, and an imaging device.

BACKGROUND OF THE INVENTION

An active matrix substrate including thin film transistors (TFT) is used in display devices, imaging devices, and the like. Gate drivers that supply signals to gate lines (pixel lines) and data drivers that supply signals to data lines (pixel lines) are mounted on the active matrix substrate. The gate drivers are connected to gate electrodes of the TFTs. The data drivers are connected to source electrodes of the TFTs.

The gate drivers and the data drivers are mounted in a frame region of the active matrix substrate by a chip on film (COF) method, a chip on glass (COG) method, or the like. In the COF method, a flexible substrate on which a driver integrated circuit (IC) is mounted is connected to the terminals of the active matrix substrate. In the COG method, the driver IC is directly connected to the terminals of the active matrix substrate. In the active matrix substrate, the terminals and the pixel lines that connect to the terminals are arranged in the same direction. A spacing between the terminals of the active matrix substrate is narrower than a spacing of the pixels lines that connect to the terminals (for example, Unexamined Japanese Patent Application Publication No. 2020-160393).

With the configuration of the terminals and the pixel lines in Unexamined Japanese Patent Application Publication No. 2020-160393, when narrowing the pixel pitch (spacing of the pixel lines) of a display device, an imaging device, or the like in order to increase the definition of the display device, imaging device, or the like the spacing of the terminals of the active matrix substrate must also be narrowed. In such a case, the yield of the process of connecting the driver IC or the flexible substrate to the active matrix substrate may decrease. Moreover, the options for usable flexible substrates decrease.

Meanwhile, an arrangement width of the terminals that connect to one driver IC or one flexible substrate increases when the spacing of the terminals of the active matrix substrate is greater than the spacing of the pixel lines that connect to the terminals. Due to this, a width in the arrangement direction of the pixel lines needed to provide the terminals that connect to one driver IC or one flexible substrate increases.

SUMMARY OF THE INVENTION

An active matrix substrate according to a first aspect of the present disclosure includes:
a plurality of pixel electrodes;
a plurality of switching elements that connect to each of the plurality of pixel electrodes;
a plurality of pixel lines that connect to each of the plurality of switching elements;
a plurality of connection lines that connect to each of the plurality of pixel lines; and
a plurality of terminals that connect to each of the plurality of connection lines, wherein
an arrangement direction of the pixel lines and an arrangement direction of the terminals differ.

A liquid crystal display device according to a second aspect of the present disclosure includes:
the active matrix substrate;
a counter substrate opposing the active matrix substrate; and
a liquid crystal sandwiched between the active matrix substrate and the counter substrate.

A self-luminous display device according to a third aspect of the present disclosure includes:
the active matrix substrate; and
a self-luminator provided on each of the pixel electrodes.

An imaging device according to a fourth aspect of the present disclosure includes:
the active matrix substrate; and
a photoelectric conversion element provided on each of the pixel electrodes.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Hereinafter, an active matrix substrate, a liquid crystal display device, a self-luminous display device, and an imaging device according to various embodiments are described while referencing the drawings.

Embodiment 1

Figure 1:
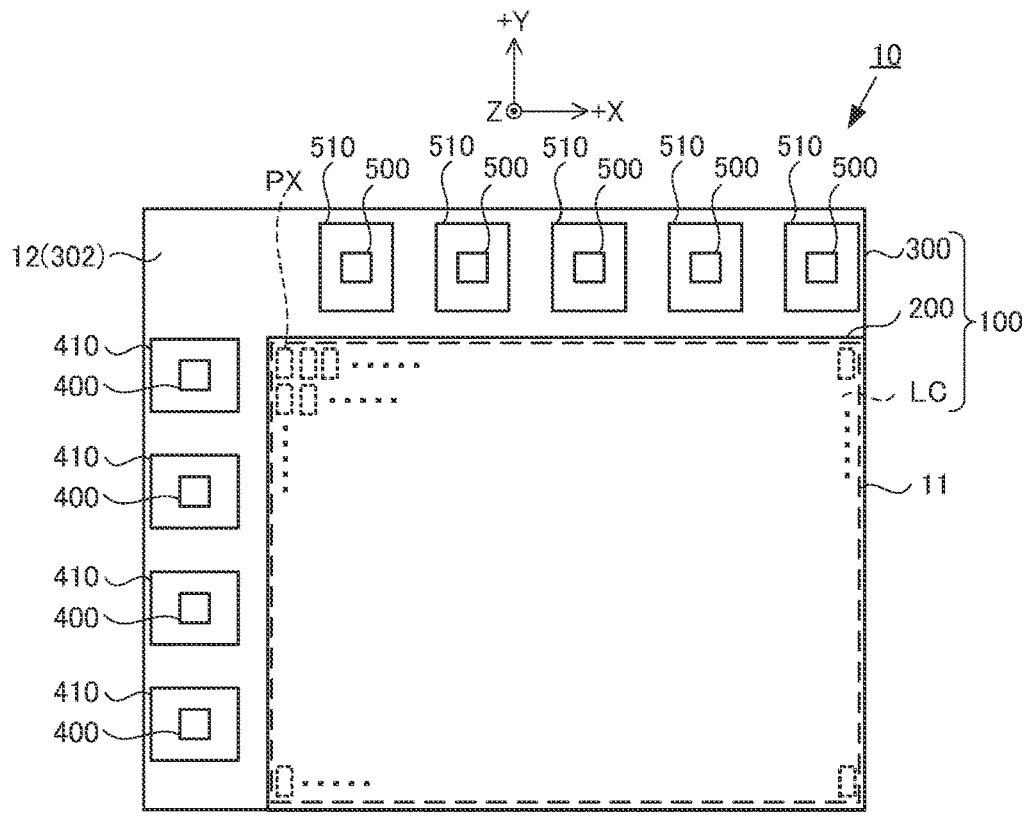
FIG. 1 is a plan view illustrating a liquid crystal display device according to Embodiment 1.

A liquid crystal display device 10 provided with an active matrix substrate 300 according to the present embodiment is described while referencing FIGS. 1 to 7. As illustrated in FIG. 1, the liquid crystal display device 10 includes a liquid crystal display panel 100, gate driver ICs 400, and data driver ICs 500. Additionally, the liquid crystal display device 10 includes a drive circuit, and a back light (not illustrated in the drawings). In the present description, to facilitate comprehension, in the liquid crystal display device 10 of FIG. 1, the right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction." Additionally, in the present description, it is assumed that an observer is positioned on the +Z side of the liquid crystal display device 10.

The liquid crystal display panel 100 of the liquid crystal display device 10 includes a counter substrate 200, the active matrix substrate 300, and a liquid crystal LC. Additionally, in the liquid crystal display panel 100, a non-illustrated polarizing plate is provided on a surface on the +Z side of the counter substrate 200 and a surface on the −Z side of the active matrix substrate 300. In the present embodiment, the liquid crystal display panel 100 is implemented as a transmissive liquid crystal display panel. In one example, the liquid crystal display panel 100 operates in a known transverse electric field mode.

The liquid crystal display panel 100 includes a display region 11 that is capable of displaying characters, images, and the like, and a frame region 12 surrounding the display region 11. A plurality of pixels PX is arranged in a matrix in the display region 11. The gate driver ICs 400 and the data driver ICs 500 are mounted in the frame region 12. As described later, the frame region 12 is formed from a frame region 302 of the active matrix substrate 300.

The counter substrate 200 of the liquid crystal display panel 100 is positioned on the +Z side (observer side). An outer dimension of the counter substrate 200 is smaller than an outer dimension of the active matrix substrate 300. The counter substrate 200 opposes the active matrix substrate 300 and is adhered to the active matrix substrate 300 by a non-illustrated seal material. The counter substrate 200 is adhered in a state in which the side on the +X side of the counter substrate 200 and the side on the +X side of the active matrix substrate 300 are aligned, and the side on the −Y side of the counter substrate 200 and the side on the −Y side of the active matrix substrate 300 are aligned. Accordingly, the end on the −X side and the end on the +Y side of the active matrix substrate 300 form the frame region 12 of the liquid crystal display panel 100 (the frame region 302 of the active matrix substrate 300).

In one example, the counter substrate 200 is implemented as a glass substrate. A color filter, a black matrix, an alignment film for aligning the liquid crystal LC, and the like (all not illustrated in the drawings) are formed on the surface of the counter substrate 200 opposing the active matrix substrate 300.

Figure 2:
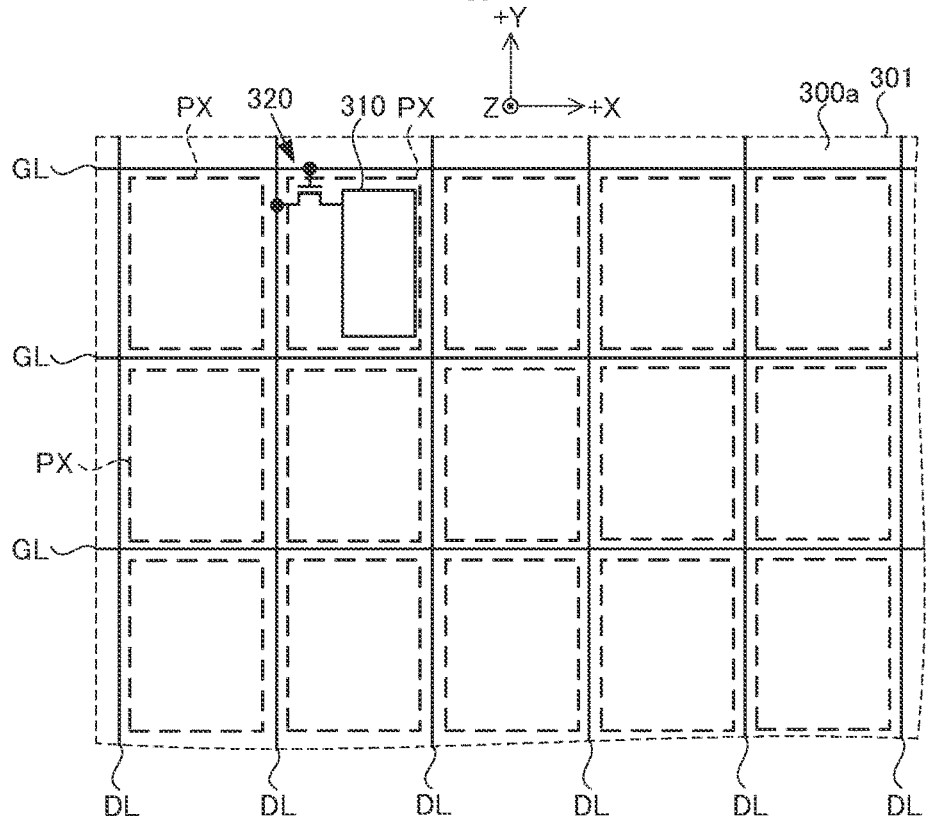
FIG. 2 is a plan view illustrating a display region of an active matrix substrate according to Embodiment 1.

The active matrix substrate 300 of the liquid crystal display panel 100 is positioned on the −Z side and opposes the counter substrate 200. In one example, the active matrix substrate 300 is implemented as a glass substrate. As illustrated in FIG. 2, pixel electrodes 310, a plurality of gate lines GL, a plurality of data lines DL, hereinafter described gate terminals 330, an alignment film for aligning the liquid crystal LC, and the like are provided on a surface 300a of the active matrix substrate 300 opposing the counter substrate 200.

Firstly, a region 301 (hereinafter referred to as the display region 301 of the active matrix substrate 300), of the active matrix substrate 300, corresponding to the display region 11 of the liquid crystal display panel 100 is described. The pixel electrodes 310, switching elements 320, the plurality of gate lines GL, the plurality of data lines DL, and the like are provided in the display region 301 of the active matrix substrate 300. Note that, to facilitate comprehension, FIG. 2 illustrates a portion of the display region 301 of the active matrix substrate 300. Additionally, FIG. 2 illustrates only the pixel electrode 310 and the switching element 320 of one pixel PX.

As illustrated in FIG. 2, the gate lines GL of the active matrix substrate 300 extend in the X direction and are arranged in the Y direction. The data lines DL of the active matrix substrate 300 extend in the Y direction and are arranged in the X direction. The gate lines GL and the data lines DL surround one set of a pixel electrode 310, a common electrode (not illustrated in the drawings), and a switching element 320 that forms a pixel PX. The gate lines GL and the data lines DL are formed from a metal such as aluminum (Al), molybdenum (Mo), or the like. The gate lines GL and the data lines DL correspond to pixel lines.

The pixel electrodes 310 of the active matrix substrate 300 are disposed in a matrix in the X direction and the Y direction. In one example, the pixel electrodes 310 are formed in comb teeth shapes from indium tin oxide (ITO). The common electrodes of the active matrix substrate 300 are formed in comb teeth shapes from ITO. The comb teeth of the pixel electrodes 310 and the comb teeth of the common electrodes are arranged alternately, parallel to each other. Due to this, a transverse electric field parallel to the surface 300a of the active matrix substrate 300 is generated between the comb teeth of the pixel electrodes 310 and the comb teeth of the common electrodes.

In one example, the switching elements 320 of the active matrix substrate 300 are implemented as TFT elements. The switching elements 320 are provided near intersections of the gate lines GL and the data lines DL. Each of the switching elements 320 includes a gate electrode, a source electrode, a drain electrode, and a semiconductor layer (all not illustrated in the drawings). The gate electrode of each of the switching elements 320 connects to a gate line GL. The source electrode of each of the switching elements 320 connects to a data line DL. The drain electrode of each of the switching elements 320 connects to a pixel electrode 310. The gate electrodes, the source electrodes, and the drain electrodes are formed from a metal such as aluminum, molybdenum, or the like. The semiconductor layer of each the switching elements 320 is formed from amorphous silicon, an oxide including indium (In), gallium (Ga), and zinc (Zn), or the like.

The switching elements 320 are sequentially driven on the basis of scanning signals supplied from the gate driver ICs 400 (gate drivers) via the gate lines GL that connect to the gate electrodes. When the switching elements 320 are in an open state, image signals (gradation voltage) supplied from the data driver ICs 500 (data drivers) are supplied to the drain electrodes via the data lines DL that connect to the source electrodes. Moreover, a predetermined transverse electric field parallel to the surface 300a of the active matrix substrate 300 is generated between the comb teeth of the pixel electrodes 310 connected to the drain electrodes and the comb teeth of the common electrodes. As a result, the predetermined transverse electric field is applied to the liquid crystal LC. Note that the common electrodes are connected to common lines. The potential of the common electrodes is controlled to a predetermined potential.

Next, the frame region 302 of the active matrix substrate 300 is described. The frame region 302 of the active matrix substrate 300 surrounds the display region 301 of the active matrix substrate 300. In the present embodiment, as illustrated in FIG. 1, the gate driver ICs 400 are mounted on the end on the −X side of the frame region 302 by a COF method using a flexible substrate 410. The data driver ICs 500 are mounted on the end on the +Y side of the frame region 302 by a COF method using a flexible substrate 510.

Figure 3:
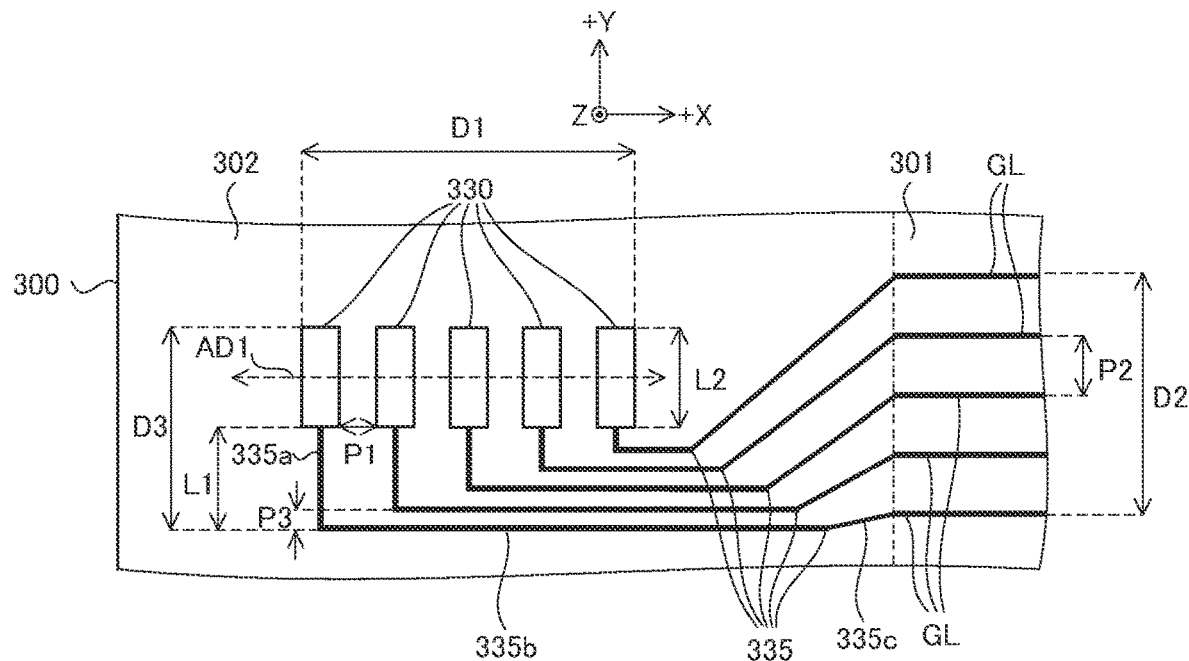
FIG. 3 is a plan view illustrating gate terminals and gate connection lines according to Embodiment 1.

As illustrated in FIG. 3, gate terminals 330 and gate connection lines 335 are provided on the end on the −X side of the frame region 302 of the active matrix substrate 300. The gate terminals 330 are terminals for connecting the gate lines GL to external objects. The gate connection lines 335 connect the gate lines GL and the gate terminals 330 to each other. The phrase "external objects" refers to devices, members, drive circuits, and the like other than the active matrix substrate 300. In the present embodiment, the flexible substrates 410, 510 correspond to the external objects. Additionally, to facilitate comprehension, FIG. 3 illustrates a portion of the frame region 302 of the active matrix substrate 300.

In the present embodiment, a plurality of adjacent gate lines GL are connected, via the same number of gate terminals 330, to one gate driver IC 400. In the present specification, to facilitate comprehension, the gate terminals 330 and the gate connection lines 335 are described using an example of a configuration in which five adjacent gate lines GL are connected, via five gate terminals 330, to one gate driver IC 400 (FIG. 3). Additionally, the data terminals 340 and the data connection lines 345 are described in the same manner as the gate terminals 330 and the gate connection lines 335.

Each of the gate terminals 330 has a rectangular shape that is long in the Y direction that is perpendicular to the direction (the X direction) in which the gate lines GL extend.

The five gate terminals 330 are arranged in the X direction that is perpendicular to the arrangement direction (the Y direction) of the gate lines GL. The gate terminals 330 are arranged in the X direction that is perpendicular to the arrangement direction of the gate lines GL. As such, when, as illustrated in FIG. 3, an arrangement width D1 of the gate terminals 330 is greater than an arrangement width D2 of the gate lines GL due to setting a spacing P1 of the gate terminals 330 to spacing at which connecting to the flexible substrate 410 is facilitated, the array of the gate terminals 330 can be accommodated in the arrangement width D2 of the gate lines GL. That is, since the arrangement direction of the gate lines GL and an arrangement direction AD1 of the gate terminals 330 are perpendicular to each other, the array of the gate terminals 330 is accommodated in the arrangement width D2 of the gate lines GL and, also, the spacing P1 of the gate terminals 330 can be set, regardless of a spacing P2 of the gate lines GL (pixel pitch of the pixels PX), to a spacing at which connecting to the flexible substrate 410 is facilitated. Due to this, the yield of the process of connecting the flexible substrate 410 to the gate terminals 330 can be improved. Moreover, the options for usable flexible substrates 410 can be increased. Furthermore, manufacturing costs of the liquid crystal display device 10 can be reduced.

The gate connection lines 335 connect the gate lines GL and the gate terminals 330 to each other. Each of the gate connection lines 335 includes a first portion 335a, a second portion 335b, and a third portion 335c. The first portion 335a extends in the −Y direction from a gate terminal 330. The second portion 335b extends in the +X direction from the first portion 335a. The third portion 335c extends to the end of the gate line GL from the second portion 335b. Each of the gate connection lines 335 extends in the −Y direction and then in the +X direction and, as such, a spacing P3 of the second portions 335b that extend in the X direction and do not need to sandwich the pixel electrode 310 and the switching element 320 can be made very narrow compared to the spacing P2 of the gate lines GL and, furthermore, a length L1 of the first portions 335a extending in the Y direction can be shortened.

In the present embodiment, as described above, the arrangement direction AD1 of the gate terminals 330 and the arrangement direction of the gate lines GL are perpendicular to each other. As such, even when the arrangement width D1 of the gate terminals 330 is greater than the arrangement width D2 of the gate lines GL, the array of the gate terminals 330 can be accommodated in the arrangement width D2 of the gate lines GL. Additionally, the gate terminals 330 are merely electrodes that electrically connect to the flexible substrate 410. As such, a length L2 in the connection direction (the Y direction) of the gate terminals 330 to the flexible substrate 410 can be made very short. Furthermore, as described above, the length L1, of the first portion 335a of each of the gate connection lines 335 that extends in the arrangement direction (the Y direction) of the gate lines GL, can be shortened. Due to this, as illustrated in FIG. 3, even when the arrangement width D1 of the gate terminals 330 is greater than the arrangement width D2 of the gate lines GL, a width D3 in the arrangement direction (the Y direction) of the gate lines GL needed in order to provide the gate terminals 330 can be made less than or equal to the arrangement width D2 of the gate lines GL. The width D3 in the arrangement direction (the Y direction) of the gate lines GL needed in order to provide the gate terminals 330 is the sum of a width, in the arrangement direction of the gate lines GL, of a region in which the gate terminals 330 are provided (in the present embodiment, the length L2 in the Y direction of the gate terminals 330), and a width, in the arrangement direction of the gate lines GL, of a region needed in order to connect the gate lines GL to the gate terminals 330 (in the present embodiment, the longest length of the lengths L1 of the first portions 335*a*).

Figure 4:
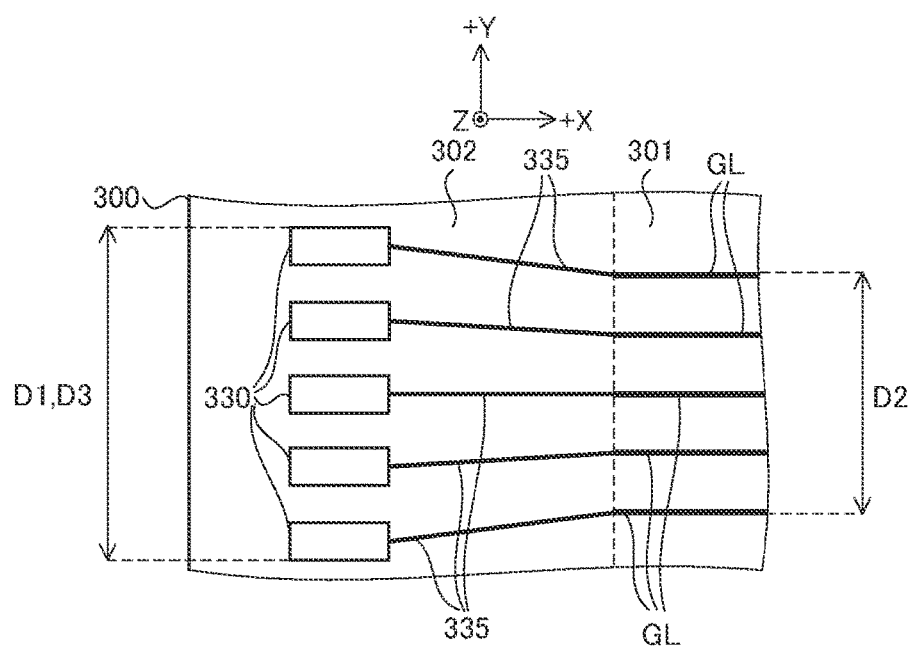
FIG. 4 is a plan view illustrating gate terminals and gate connection lines according to Comparative Example 1.

Meanwhile, when, as illustrated in FIG. 4, the gate terminals 330 are arranged in the same direction as the arrangement direction (the Y direction) of the gate lines GL, and the arrangement width D1 of the gate terminals 330 is greater than the arrangement width D2 of the gate lines GL (hereinafter referred to as the comparative example), the width D3 in the arrangement direction of the gate lines GL needed in order to provide the gate terminals 330 is greater than the arrangement width D2 of the gate lines GL. That is, in the comparative example, when the arrangement width D1 of the gate terminals 330 is increased by setting the spacing P1 of the gate terminals 330 to a spacing at which connecting to the flexible substrate 410 is facilitated, the width D3 in the arrangement direction of the gate lines GL needed in order to provide the gate terminals 330 is greater than the arrangement width D2 of the gate lines GL.

Figure 5:
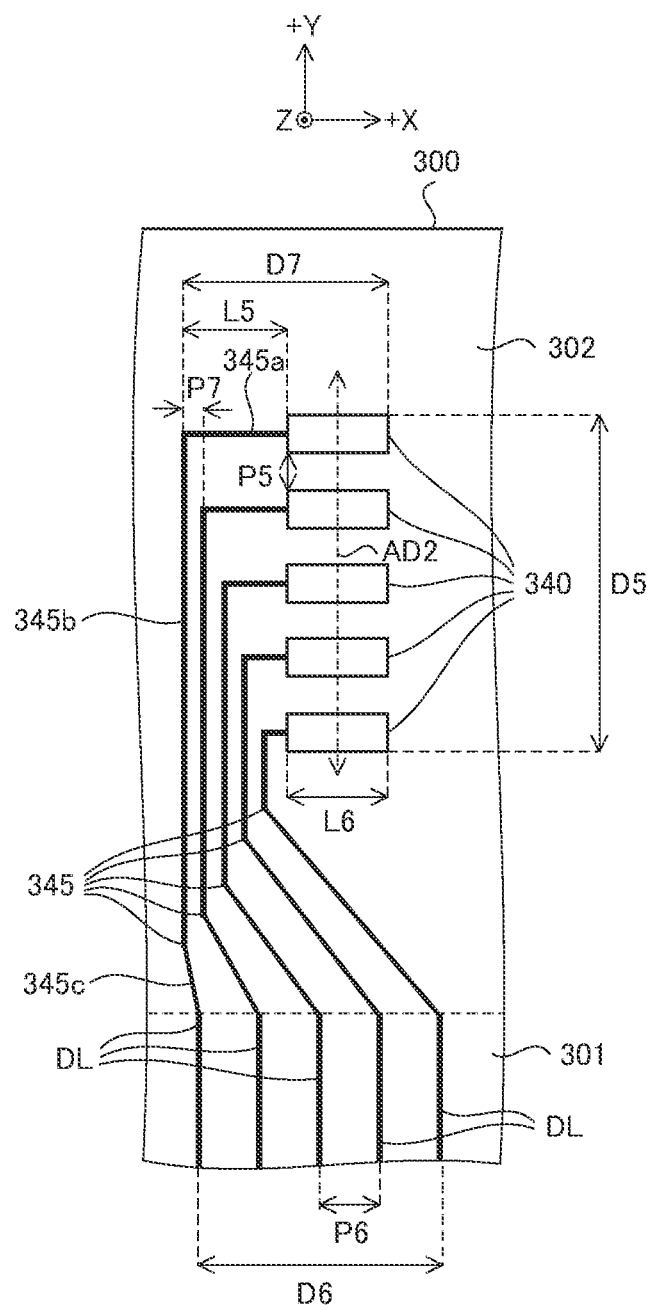
FIG. 5 is a plan view illustrating data terminals and data connection lines according to Embodiment 1.

As illustrated in FIG. 5, the data terminals 340 and the data connection lines 345 are provided on the end on the +Y side of the frame region 302 of the active matrix substrate 300. The data terminals 340 are terminals for connecting the data lines DL to external objects (the flexible substrate 510). The data connection lines 345 connect the data lines DL and the data terminals 340 to each other. Note that, to facilitate comprehension, FIG. 5 illustrates a portion of the frame region 302 of the active matrix substrate 300. In the following, the data terminals 340 and the gate terminals 330 may be referred to collectively as "terminals." Additionally, the gate connection lines 335 and the data connection lines 345 may be referred to collectively as "connection lines."

In the present embodiment, a plurality of adjacent data lines DL are connected, via the same number of data terminals 340, to one data driver IC 500. As with the gate terminals 330 and the gate connection lines 335, the data terminals 340 and the data connection lines 345 are described using an example of a configuration in which five adjacent data lines DL are connected, via five data terminals 340, to one data driver IC 500 (FIG. 5).

Each of the data terminals 340 has a rectangular shape that is long in the X direction that is perpendicular to the direction (the Y direction) in which the data lines DL extend. The five data terminals 340 are arranged in the Y direction that is perpendicular to the arrangement direction (the X direction) of the data lines DL. The arrangement direction of the data lines DL and an arrangement direction AD2 of the data terminals 340 are perpendicular to each other. As such, as with the gate terminals 330, even when an arrangement width D5 of the data terminals 340 is greater than an arrangement width D6 of the data lines DL, the array of the data terminals 340 can be accommodated in the arrangement width D6 of the data lines DL. That is, a spacing P5 of the data terminals 340 can be set, regardless of a spacing P6 of the data lines DL (pixel pitch of the pixels PX), to a spacing at which connecting to the flexible substrate 510 is facilitated. Due to this, the yield of the process of connecting the flexible substrate 510 to the data terminals 340 can be improved. Moreover, the options for usable flexible substrates 510 can be increased. Furthermore, manufacturing costs of the liquid crystal display device 10 can be reduced.

The data connection lines 345 connect the data lines DL and the data terminals 340 to each other. Each of the data connection lines 345 includes a fifth portion 345*a*, a sixth portion 345*b*, and a seventh portion 345*c*. The fifth portion 345*a* extends in the −X direction from a data terminal 340, and the sixth portion 345*b* extends in the −Y direction from the fifth portion 345*a*. The seventh portion 345*c* extends to the end of the data line DL from the sixth portion 345*b*. Each of the data connection lines 345 extends in the −X direction and then in the −Y direction and, as such, as with the gate connection lines 335, a spacing P7 of the sixth portions 345*b* can be made very narrow compared to the spacing P6 of the data lines DL and, furthermore, a length L5 of the fifth portions 345*a* extending in the X direction can be shortened.

In the present embodiment, even when the arrangement width D5 of the data terminals 340 is greater than the arrangement width D6 of the data lines DL, the array of the data terminals 340 can be accommodated in the arrangement width D6 of the data lines DL. Additionally, the data terminals 340 are merely electrodes that electrically connect to the flexible substrate 510. As such, a length L6 in the connection direction (the X direction) of the data terminals 340 to the flexible substrate 510 can be made very short. The length L5 of the fifth portion 345*a* of each of data connection lines 345 that extends in the arrangement direction of the data lines DL can be shortened. Due to this, as illustrated in FIG. 5, even when the arrangement width D5 of the data terminals 340 is greater than the arrangement width D6 of the data lines DL, a width D7 in the arrangement direction of the data lines DL needed in order to provide the data terminals 340 can be made less than or equal to the arrangement width D6 of the data lines DL.

The liquid crystal LC of the liquid crystal display panel 100 is implemented as a nematic liquid crystal. The liquid crystal LC is homogeneously aligned by the alignment film of the counter substrate 200 and the alignment film of the active matrix substrate 300. The liquid crystal LC rotates in a plane parallel to the surface 300*a* of the active matrix substrate 300 due to the transverse electric field generated by the potential difference between the pixel electrodes 310 and the common electrodes. As a result, the amount of transmitted light of the pixels PX is controlled for every pixel PX.

Figure 6:
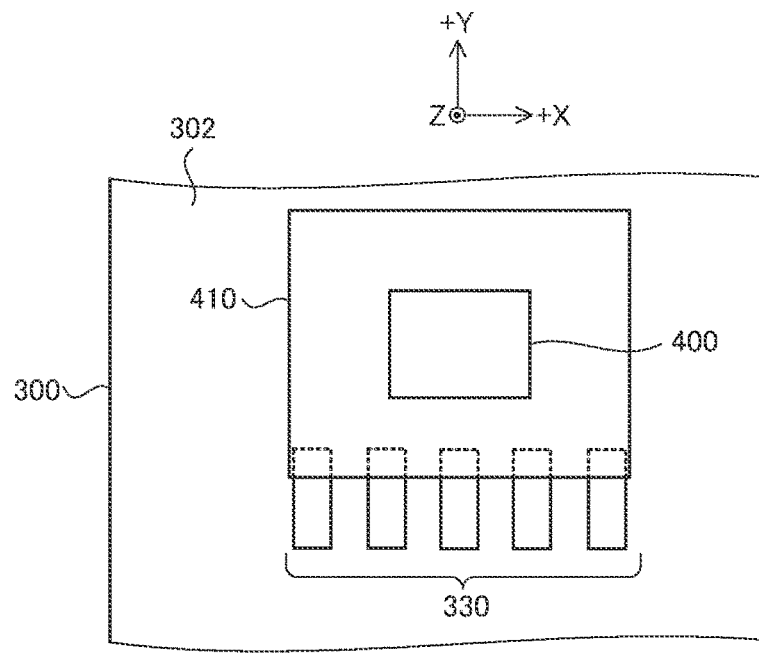
FIG. 6 is a plan view illustrating a gate driver IC and a flexible substrate according to Embodiment 1.

The gate driver ICs 400 of the liquid crystal display device 10 sequentially supply scanning signals to the gate lines GL of the liquid crystal display panel 100 on the basis of signals from the drive circuit to sequentially drive the pixels PX that include the switching elements 320 that connect to the gate lines GL. As illustrated in FIG. 6, each of the gate driver ICs 400 is connected to the gate terminals 330 via a flexible substrate 410 (COF method), The flexible substrate 410 on which the gate driver IC 400 is mounted includes wiring that connects the gate driver IC 400 and the gate terminals 330 to each other. The flexible substrate 410 is connected to the plurality of gate terminals 330 by thermocompression using an anisotropic conductive film (ACF). Additionally, the flexible substrate 410 is connected to the drive circuit. Note that the wiring of the flexible substrate 410, the gate connection lines 335, and the like are omitted from FIG. 6.

Figure 7:
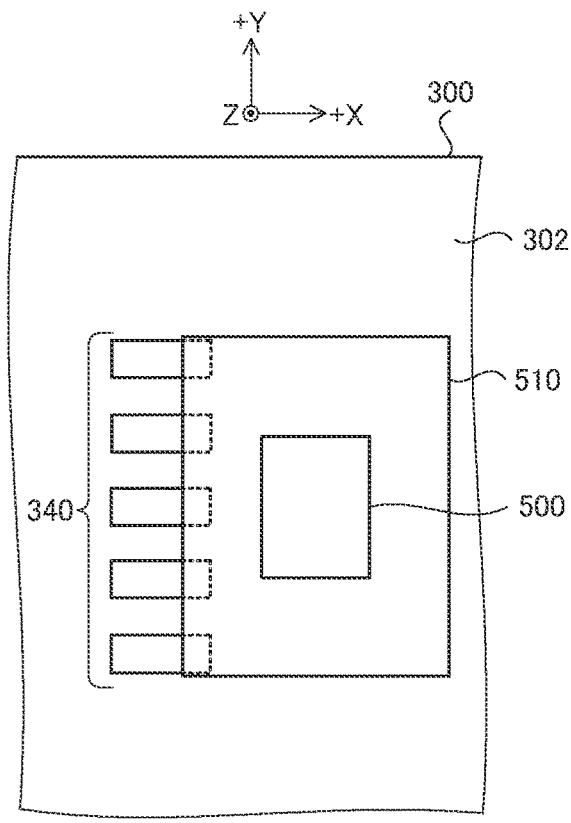
FIG. 7 is a plan view illustrating a data driver IC and a flexible substrate according to Embodiment 1.

The data driver ICs 500 of the liquid crystal display device 10 supply image signals (gradation voltage) to each of the data lines DL of the liquid crystal display panel 100 on the basis of signals from the drive circuit. As illustrated in FIG. 7, each of the data driver ICs 500 is connected to the data terminals 340 via a flexible substrate 510. The configuration of the flexible substrate 510 is the same as the configuration of the flexible substrate 410. Note that the wiring of the flexible substrate 510, the data connection lines 345, and the like are omitted from FIG. 7.

As described above, the gate terminals 330 are arranged in the direction (the X direction) perpendicular to the arrangement direction (the Y direction) of the gate lines GL that connect to the gate terminals 330, and the data terminals 340 are arranged in the direction (the Y direction) perpendicular to the arrangement direction (the X direction) of the data lines DL that connect to the data terminals 340. As a result, the spacings of the terminals (the spacing P1 of the gate terminals 330, the spacing P5 of the data terminals 340) can, regardless of the pixel pitch of the pixels PX (the spacing P2 of the gate lines GL, the spacing P6 of the data lines DL), be set to a spacing at which connecting to the flexible substrates 410, 510 is facilitated. Furthermore, even when the arrangement widths of the terminals (the arrangement width D1 of the gate terminals 330, the arrangement width D5 of the data terminals 340) are greater than the arrangement widths of the pixel lines (the arrangement width D2 of the gate lines GL, the arrangement width D6 of the data lines DL), the widths in the arrangement direction of the pixel lines (the width D3 in the arrangement direction of the gate lines GL, the width D7 in the arrangement direction of the data lines DL) needed in order to provide the terminals can be made less than or equal to the arrangement widths of the pixel lines.

Embodiment 2

In Embodiment 1, the terminals (the gate terminals 330, the data terminals 340) are arranged in directions perpendicular to the arrangement directions of the pixel lines (the gate lines GL, the data lines DL) that connect to the terminals. However, it is sufficient that the arrangement directions of the terminals and the arrangement directions of the pixel lines differ.

In the present embodiment, the arrangement directions of the terminals and the arrangement direction of the pixel lines are described using the gate lines GL and the gate terminals 330 as an example. With the exception of the configuration of the gate terminals 330, the configuration of the liquid crystal display device 10 of the present embodiment is the same as the configuration of the liquid crystal display device 10 of Embodiment 1.

Figure 8:
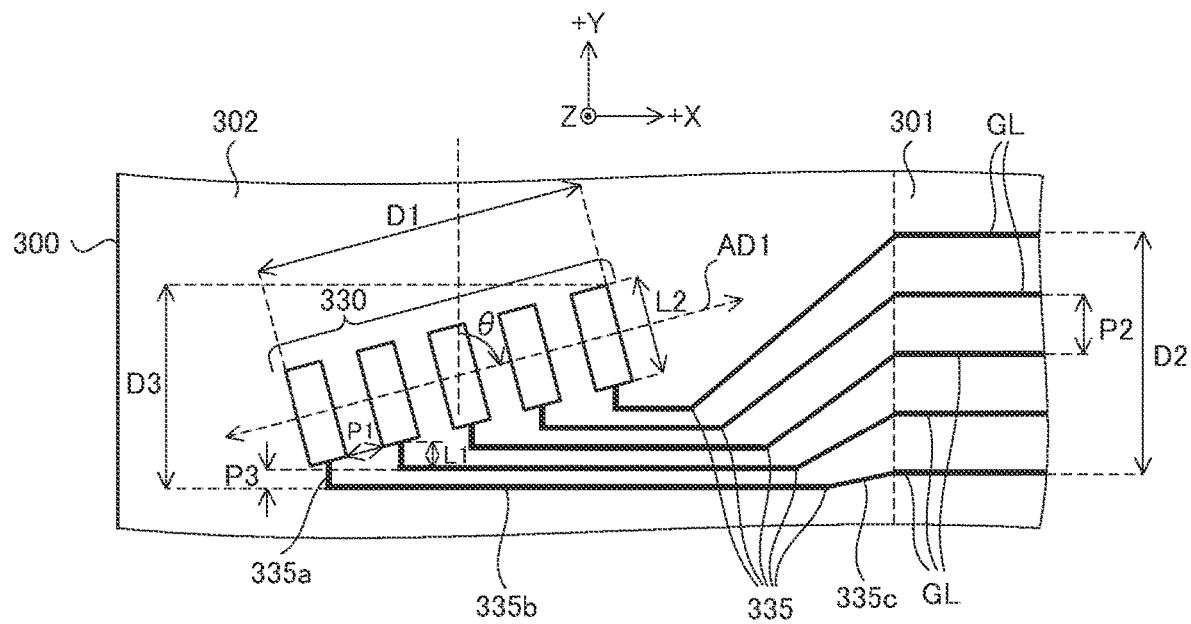
FIG. 8 is a plan view illustrating gate terminals and gate connection lines according to Embodiment 2.

As illustrated in FIG. 8, an arrangement direction AD1 of the gate terminals 330 of the present embodiment is rotated clockwise an acute angle (angle θ) with respect to the +Y direction that is the arrangement direction of the gate lines GL. That is, the arrangement direction of the gate lines GL and the arrangement direction AD1 of the gate terminals 330 differ.

As illustrated in FIG. 8, due to the arrangement direction of the gate lines GL and the arrangement direction AD1 of the gate terminals 330 differing, even when the arrangement width D1 of the gate terminals 330 is greater than the arrangement width D2 of the gate lines GL, the array of the gate terminals 330 can be accommodated in the arrangement width D2 of the gate lines GL. Furthermore, as in Embodiment 1, the length L2 in the connection direction to the flexible substrate 410 of the gate terminals 330 can be made very short, and the length L1 of the first portion 335a of the gate connection lines 335 extending in the Y direction can be shortened. As a result, even when the arrangement width D1 of the gate terminals 330 is greater than the arrangement width D2 of the gate lines GL, the width D3 in the arrangement direction of the gate lines GL needed in order to provide the gate terminals 330 can be made narrower than the arrangement width D2 of the gate lines GL.

Additionally, as in Embodiment 1, the spacing P1 of the gate terminals 330 can be set to a spacing at which connecting to the flexible substrate 410 is facilitated. As a result, the yield of the process of connecting the flexible substrate 410 to the gate terminals 330 can be improved. The options for usable flexible substrates 410 can also be increased. Additionally, manufacturing costs of the liquid crystal display device 10 can be reduced. Furthermore, the lengths of the gate connection lines 335 and the data connection lines 345 can be shortened.

Figure 9:
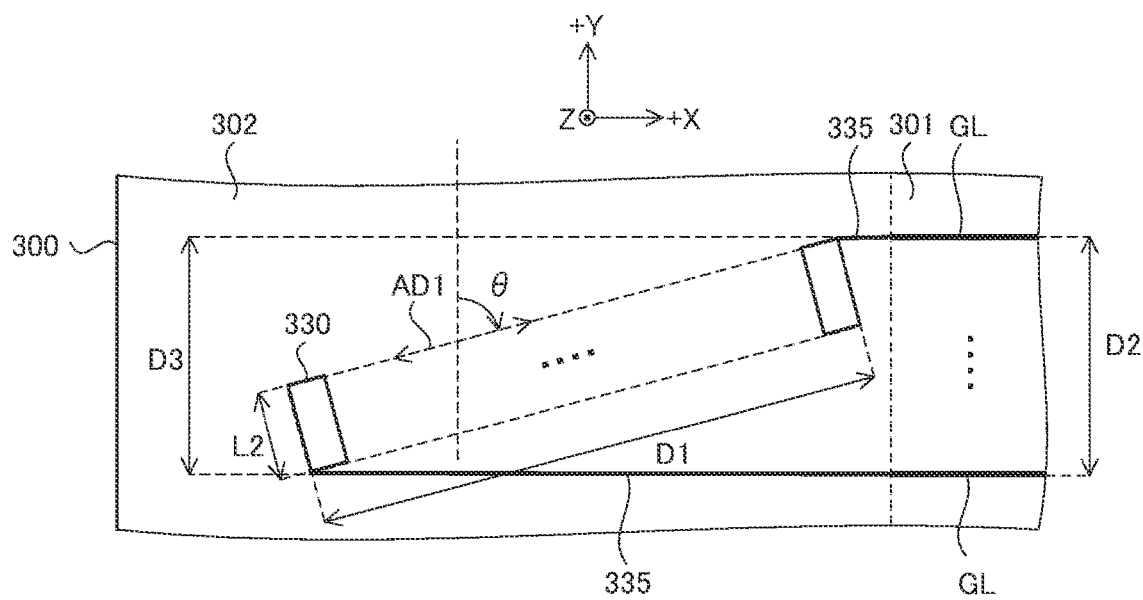
FIG. 9 is a schematic drawing for explaining an arrangement direction of the gate terminals according to Embodiment 2.

Note that, as illustrated in FIG. 9, when assuming a configuration in which the gate terminals 330 are disposed across the entire length of the arrangement width D2 of the gate lines GL, the width D3 in the arrangement direction of the gate lines GL needed in order to provide the gate terminals 330 is expressed by Equation (1) below. Accordingly, it is preferable that the angle θ formed between the arrangement direction AD1 of the gate terminals 330 and the +Y direction satisfies Equation (2) below.

$$D3 = D1 \times \cos\theta + \frac{L2}{\sin\theta} \quad (1)$$

$$D1 \times \cos\theta + \frac{L2}{\sin\theta} \leq D2 \quad (2)$$

Embodiment 3

A configuration is possible in which the liquid crystal display panel 100 (the active matrix substrate 300) of the liquid crystal display device 10 is curved. Additionally, it is sufficient that one of the gate terminals 330 and the data terminals 340 is arranged in a direction perpendicular to the arrangement direction of the connecting pixel lines. The configurations of the gate driver ICs 400 and the data driver ICs 500 of the present embodiment are the same as in Embodiment 1. Here, the liquid crystal display panel 100 of the present embodiment is described.

Figure 10:
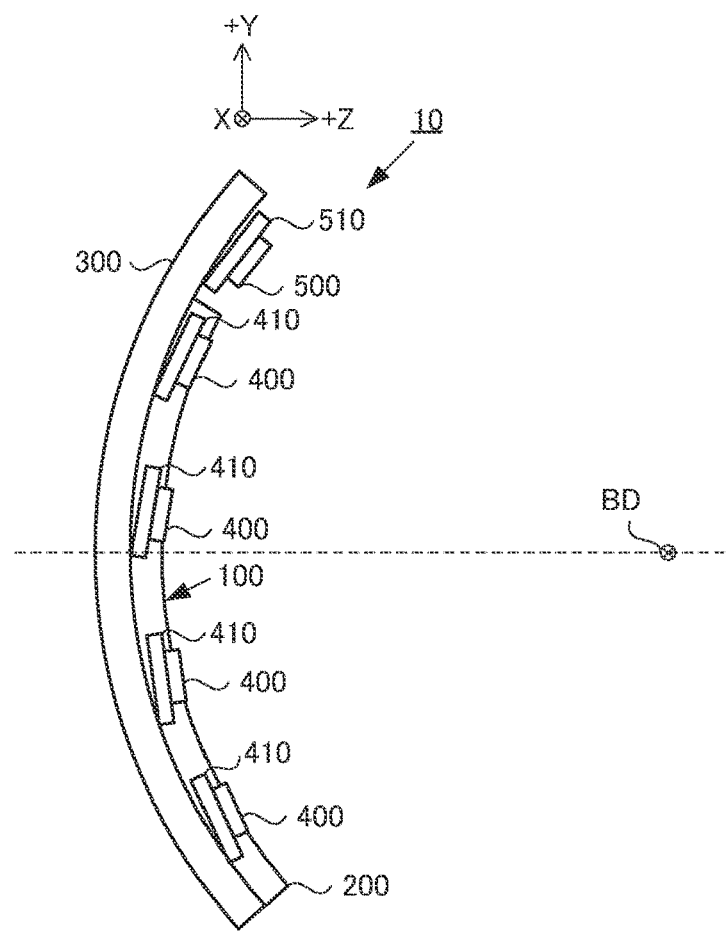
FIG. 10 is a side view illustrating a liquid crystal display device according to Embodiment 3.

As illustrated in FIG. 10, the liquid crystal display panel 100 (the active matrix substrate 300) of the present embodiment is curved convexly to the −Z side around a curve axis parallel to the X axis. The configurations of the counter substrate 200, and the pixel electrodes 310, the switching elements 320, the gate lines GL, and the data lines DL of the active matrix substrate 300 are the same as in Embodiment 1. Here, the gate terminals 330, the gate connection lines 335, the data terminals 340, and the data connection lines 345 are described.

As with the gate terminals 330 of Embodiment 1, each of the gate terminals 330 of the present embodiment has a rectangular shape. The gate terminals 330 of the present embodiment are arranged in the X direction that is perpendicular to the arrangement direction (the Y direction) of the gate lines GL (FIG. 3). Additionally, as with the gate connection lines 335 of Embodiment 1, the gate connection lines 335 of the present embodiment connect the gate lines GL and the gate terminals 330 to each other.

Figure 11:
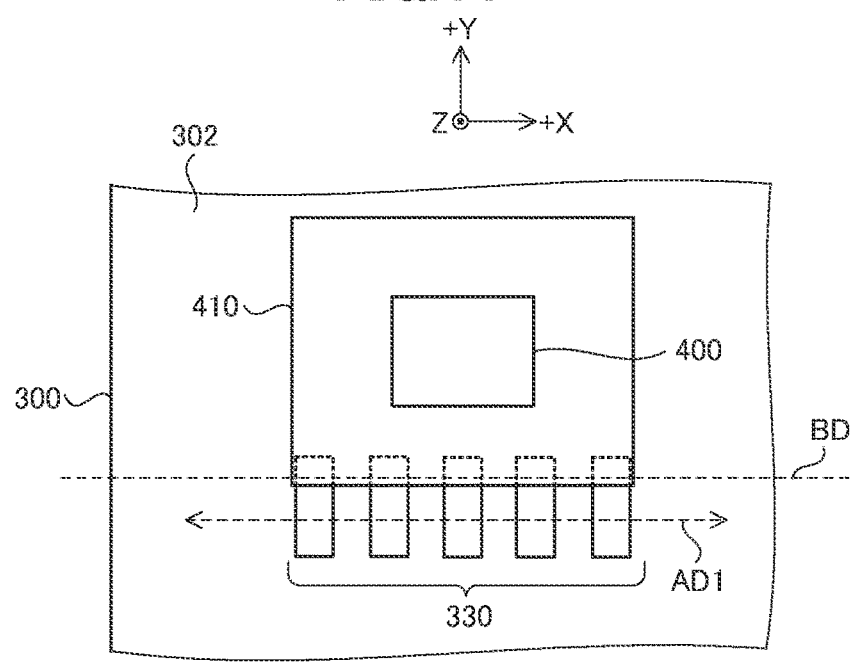
FIG. 11 is a plan view illustrating gate terminals and a flexible substrate according to Embodiment 3.

In the present embodiment, the gate terminals 330 are arranged in the X direction and, as such, when viewing the active matrix substrate 300 from above as illustrated in FIG. 11, the arrangement direction AD1 of the gate terminals 330 and a curve axis BD of the active matrix substrate 300 are parallel to each other. As a result, in the mounting of the gate driver ICs 400, stress, caused by the curving of the active matrix substrate 300, applied to the gate terminals 330 and the flexible substrate 410 can be relaxed.

Figure 12:
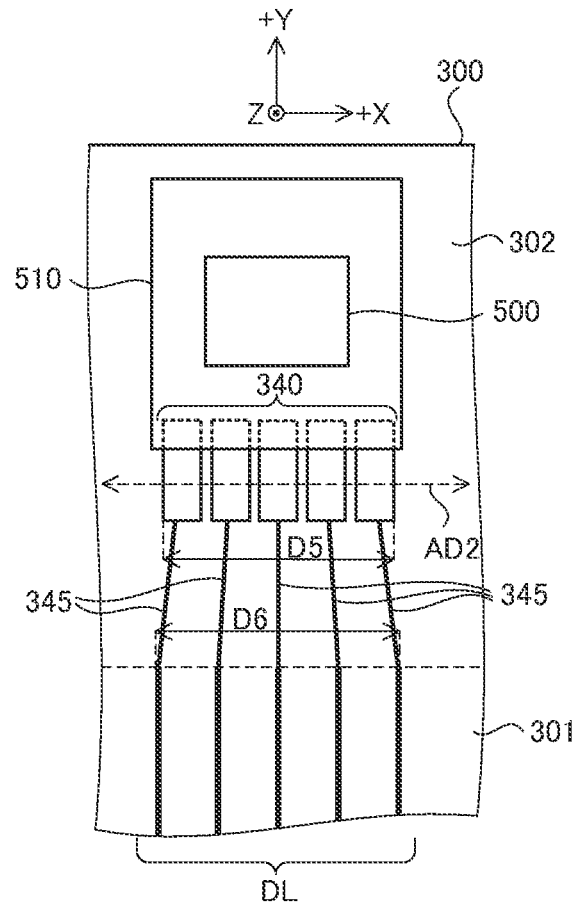
FIG. 12 is a plan view illustrating data terminals and a flexible substrate according to Embodiment 3.

As illustrated in FIG. 12, each of the data terminals 340 of the present embodiment has a rectangular shape. The data terminals 340 of the present embodiment are arranged in the same direction as (a direction parallel to) the arrangement direction (the X direction) of the data lines DL. In the present embodiment, the arrangement width D5 of the data terminals 340 is narrower than the arrangement width D6 of the data lines DL. The data connection lines 345 of the present embodiment linearly connect the data terminals 340 and the data lines DL to each other.

The data terminals 340 are arranged in the X direction and, as such, when viewing the active matrix substrate 300 from above, the arrangement direction AD2 of the data terminals 340 and the curve axis BD of the active matrix substrate 300 are also parallel to each other. Accordingly, in the mounting of the data driver ICs 500 as well, stress, caused by the curving of the active matrix substrate 300, applied to the data terminals 340 and the flexible substrate 510 can be relaxed.

In the present embodiment, the arrangement directions of the terminals (the arrangement direction AD1 of the gate terminals 330, the arrangement direction AD2 of the data terminals 340) and the curve axis BD of the active matrix substrate 300 are parallel to each other and, as such, the stress, caused by the curving of the active matrix substrate 300, applied to the terminals (the gate terminals 330, the data terminals 340) and the flexible substrates 410, 510 can be relaxed. Furthermore, the arrangement direction AD of the gate terminals 330 and the arrangement direction of the gate lines GL are perpendicular to each other and, as such, as with Embodiment 1, the spacing P1 of the gate terminals 330 can be set, regardless of the pixel pitch of the pixels PX, to a spacing at which connecting to the flexible substrate 410 is facilitated. Furthermore, even when the arrangement width D1 of the gate terminals 330 is greater than the arrangement width D2 of the gate lines GL, the width D3 in the arrangement direction of the gate lines GL needed in order to provide the gate terminals 330 can be made less than or equal to the arrangement width D2 of the gate lines GL.

Embodiment 4

In Embodiment 1, the flexible substrate 410 extends to the +Y side from the connecting gate terminals 330, and does not overlap the gate connection lines 335 that connect to the gate terminals 330. Additionally, the flexible substrate 510 extends to the +X side from the connecting data terminals 340, and does not overlap the data connection lines 345 that connect to the data terminals 340. However, a configuration is possible in which the flexible substrate 410 overlaps the gate connection lines 335. A configuration is possible in which the flexible substrate 510 overlaps the data connection lines 345. Here, the flexible substrate 410 is described using the flexible substrate 410, the gate terminals 330, and the gate connection lines 335 as an example.

The flexible substrate 410 on which each of the gate driver ICs 400 is mounted is connected to the gate terminals 330 by thermocompression using an anisotropic conductive film ACF. In the present embodiment, as illustrated in FIG. 13, the flexible substrate 410 extends to the −Y side from the gate terminals 330 and overlaps the gate connection lines 335 that connect the gate terminals 330 and the gate lines GL to each other.

Figure 13:
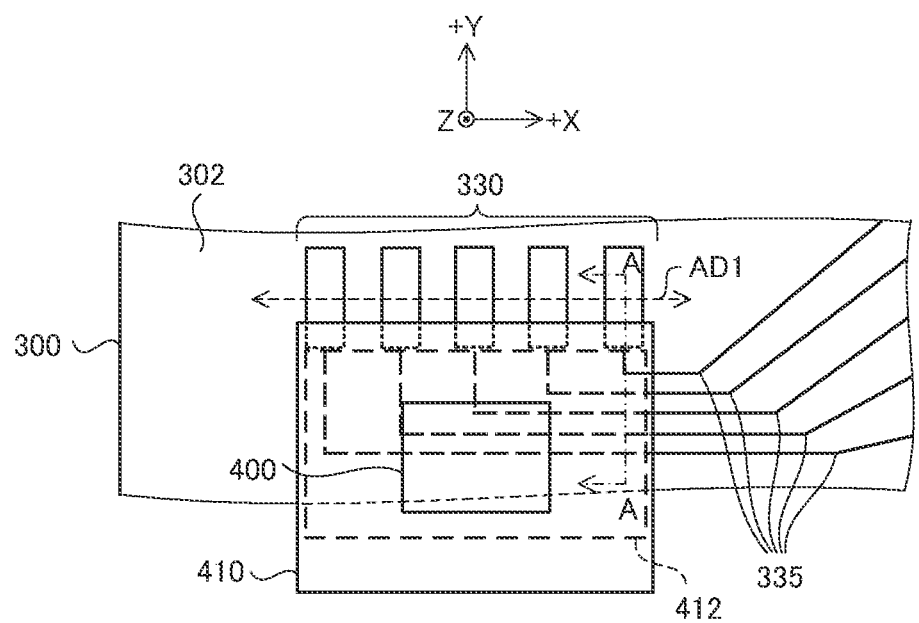
FIG. 13 is a plan view illustrating gate connection lines and a flexible substrate according to Embodiment 4.
Figure 14:
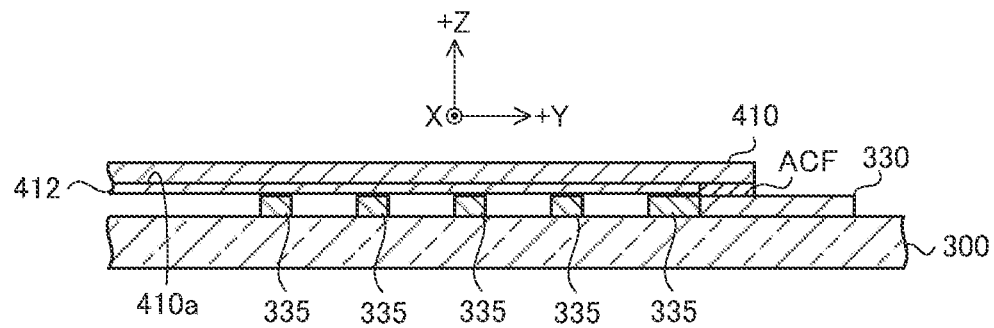
FIG. 14 is a cross-sectional view of the gate connection lines and the flexible substrate illustrated in FIG. 13, taken along line A-A.

Additionally, as illustrated in FIGS. 13 and 14, the flexible substrate 410 includes a shield 412 on a surface 410a opposing the gate connection lines 335 (the active matrix substrate 300). The shield 412 blocks noise between the wiring of the flexible substrate 410 and the gate connection lines 335. The shield 412 is formed in a thin film form from copper (Cu), aluminum (Al), or the like.

In the present embodiment, the flexible substrate 410 is disposed at a position overlapping the gate connection lines 335 and, as such, the space in which the flexible substrate 410 is disposed can be reduced. Additionally, the flexible substrate 410 includes the shield 412 on the surface 410a opposing the gate connection lines 335 and, as such, can block the noise between the wiring of the flexible substrate 410 and the gate connection lines 335.

Embodiment 5

In Embodiments 1 to 4, the active matrix substrate 300 is used in the liquid crystal display device 10. A configuration is possible in which the active matrix substrate 300 is used in a different device. In the present embodiment, a self-luminous display device 20 provided with the active matrix substrate 300 is described.

Figure 15:
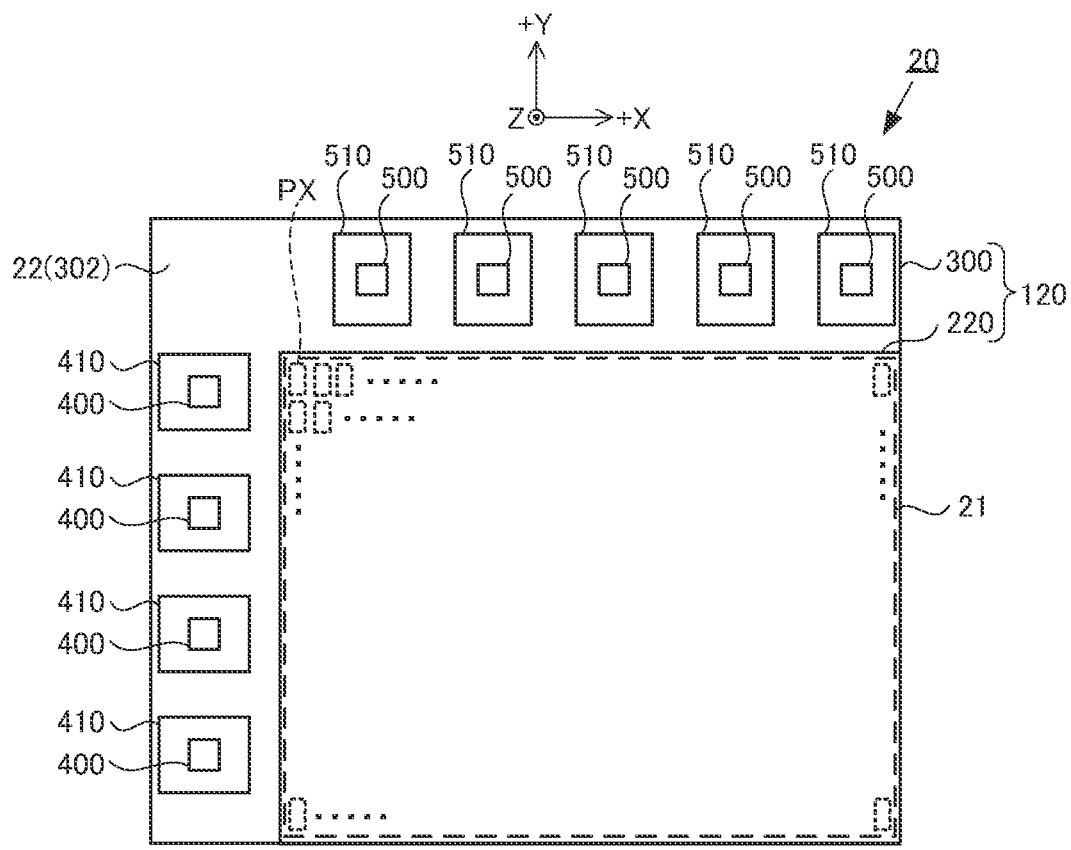
FIG. 15 is a plan view illustrating a self-luminous display device according to Embodiment 5.

In one example, the self-luminous display device 20 is implemented as an organic light emitting diode (OLED) display device. As illustrated in FIG. 15, the self-luminous display device 20 includes an OLED display panel 120, gate driver ICs 400, and data driver ICs 500. Additionally, the self-luminous display device 20 includes a non-illustrated drive circuit. The configurations of the gate driver ICs 400 and the data driver ICs 500 are the same as in Embodiment 1 and, as such, the OLED display panel 120 is described.

The OLED display panel 120 includes a sealing substrate 220 and an active matrix substrate 300. The OLED display panel 120 includes a display region 21 that is capable of displaying characters, images, and the like, and a frame region 22 surrounding the display region 21. As with the liquid crystal display panel 100 of Embodiment 1, a plurality of pixels PX is arranged in a matrix in the display region 21. Additionally, the gate driver ICs 400 and the data driver ICs 500 are mounted in the frame region 22.

The sealing substrate 220 of the OLED display panel 120 is joined to the active matrix substrate 300 by glass frit. The sealing substrate 220 seals the display region 301 of the active matrix substrate 300. Dry air is sealed between the sealing substrate 220 and the active matrix substrate 300.

Figure 16:
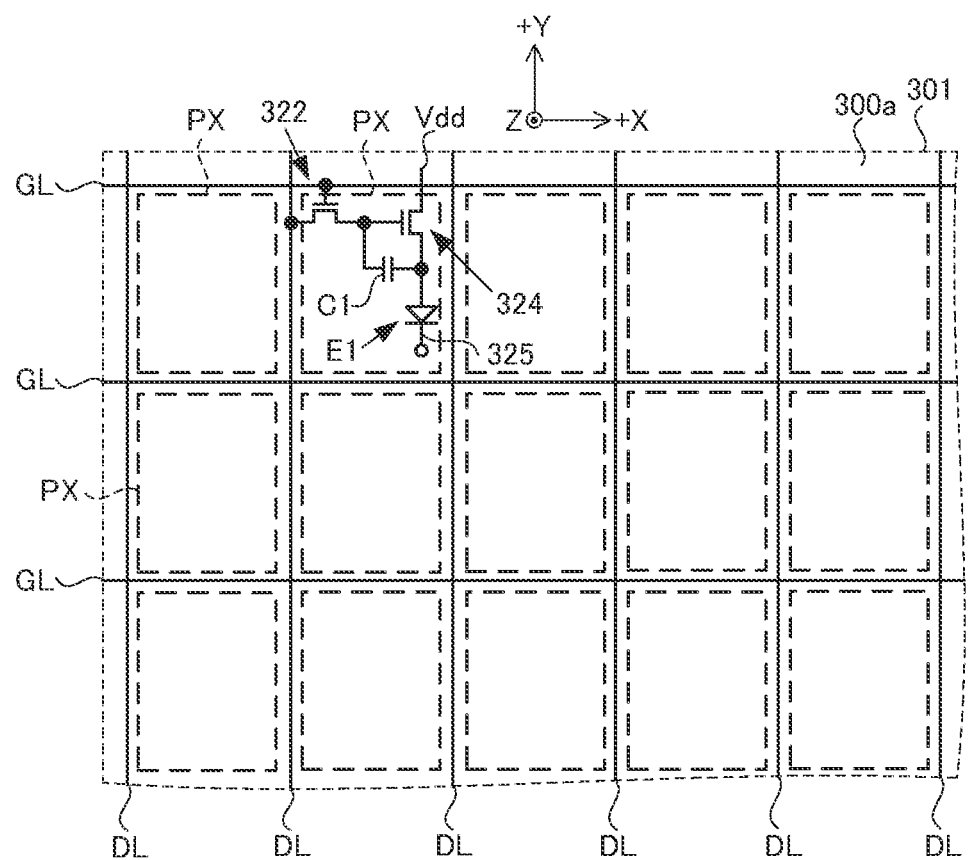
FIG. 16 is a plan view illustrating a display region of an active matrix substrate according to Embodiment 5.

In one example, the active matrix substrate 300 of the OLED display panel 120 is implemented as a glass substrate. As illustrated in FIG. 16, switching elements 322, light emitting elements E1, gate lines GL, data lines DL, and the like are provided in the display region 301 (a surface 300a) of the active matrix substrate 300.

The configurations of the gate lines GL and the data lines DL of the present embodiment are the same as the configurations of the gate lines GL and the data lines DL of Embodiment 1. In the present embodiment, the gate lines GL and the data lines DL surround the switching elements 322, 324, a holding capacitor C1, and a light emitting element E1 that form a pixel PX.

The switching elements 322, 324 and the holding capacitor C1 of the active matrix substrate 300 form a pixel circuit. The pixel circuit controls the light emission of the light emitting element E1. The pixel circuit is connected to a gate driver IC 400 and a data driver IC 500 via a gate line GL and a data line DL.

The switching elements 322 are TFT elements for selecting the pixels PX. A gate electrode of each of the switching elements 322 connects to the gate line GL. A source electrode of each of the switching elements 322 connects to a data line DL. A drain electrode of each of the switching elements 322 connects to the gate electrode of the switching element 324.

The switching elements 324 are TFT elements for driving the light emitting elements E1. A gate electrode of each of the switching elements 324 connects to the drain electrode of each of the switching elements 322. A source electrode of each of the switching elements 324 connects to a power supply line Vdd. The drain electrode of each of the switching elements 324 connects to a hereinafter described anode electrode 602 of each of the light emitting elements E1. Note that a cathode electrode of each of the light emitting elements E1 connects to a cathode line 325. In the present embodiment, the anode electrode 602 of each of the light emitting elements E1 corresponds to a pixel electrode.

The holding capacitor C1 is formed between the anode electrode 602 of each of the light emitting elements E1 and the gate electrode of each of the switching elements 324.

The pixel circuit operates as follows. The gate driver IC 400 outputs a scanning signal to the gate lines GL and sets the switching element 322 to an open state. When the switching element 322 assumes the open state, gradation voltage supplied via the data driver IC 500 and the data lines DL is held by the holding capacitor C1. The open/close state of the switching element 324 changes due to the voltage held by the holding capacitor C1, and current corresponding to the gradation of the light emitting element E1 is supplied to the light emitting element E1 from the power supply line Vdd. Then, the light emitting element E1 emits light and a character, image, or the like is displayed in the display region 21.

Figure 17:
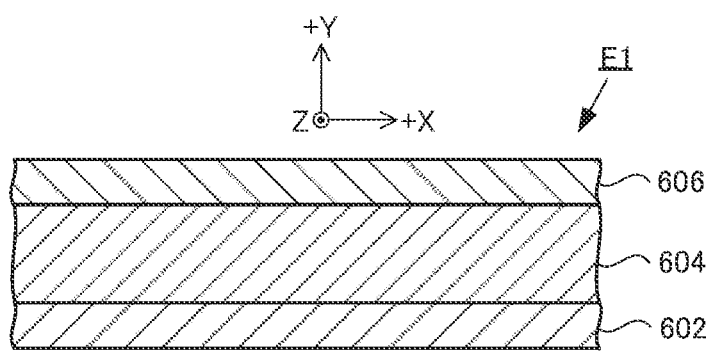
FIG. 17 is a cross-sectional view illustrating a light emitting element according to Embodiment 5.

As illustrated in FIG. 17, the light emitting element E1 is formed from the anode electrode (pixel electrode) 602, a self-luminator 604, and a cathode electrode 606. The anode electrode 602 is connected to the drain electrode of the switching element 324. In one example, the anode electrode 602 includes three layers, namely, ITO, aluminum alloy or silver alloy, and ITO. The self-luminator 604 is provided on the anode electrode 602. In one example, the self-luminator 604 is formed from a hole injection layer, a hole transport layer, an organic light emitting layer, an electron transport layer, and an electron injection layer. The cathode electrode 606 is provided on the self-luminator 604 and is connected to the cathode line 325. The cathode electrode 606 is formed from lithium (Li), aluminum, magnesium (Mg), ytterbium (Yb), alloys thereof, or the like.

The configurations of the gate terminals 330 and the data terminals 340 of the active matrix substrate 300 are the same as in Embodiment 1 (FIGS. 3 and 5). In the present embodiment as well, the gate terminals 330, the data terminals 340, the gate connection lines 335, and the data connection lines 345 are provided in the frame region 302 (the surface 300a) of the active matrix substrate 300. The gate terminals 330 that connect to the gate lines GL are arranged in a direction that is perpendicular to the arrangement direction of the gate lines GL. The data terminals 340 that connect to the data lines DL are arranged in a direction that is perpendicular to the arrangement direction of the data lines DL. The gate terminals 330 and the gate lines GL are connected to each other by the gate connection lines 335. The data terminals 340 and the data lines DL are connected to each other by the data connection lines 345.

Thus, the active matrix substrate 300 of the present embodiment is used in the self-luminous display device 20.

Embodiment 6

In Embodiments 1 to 4, the active matrix substrate 300 is used in the liquid crystal display device 10. However, a configuration is possible in which the active matrix substrate 300 is used in an imaging device 30.

Figure 18:
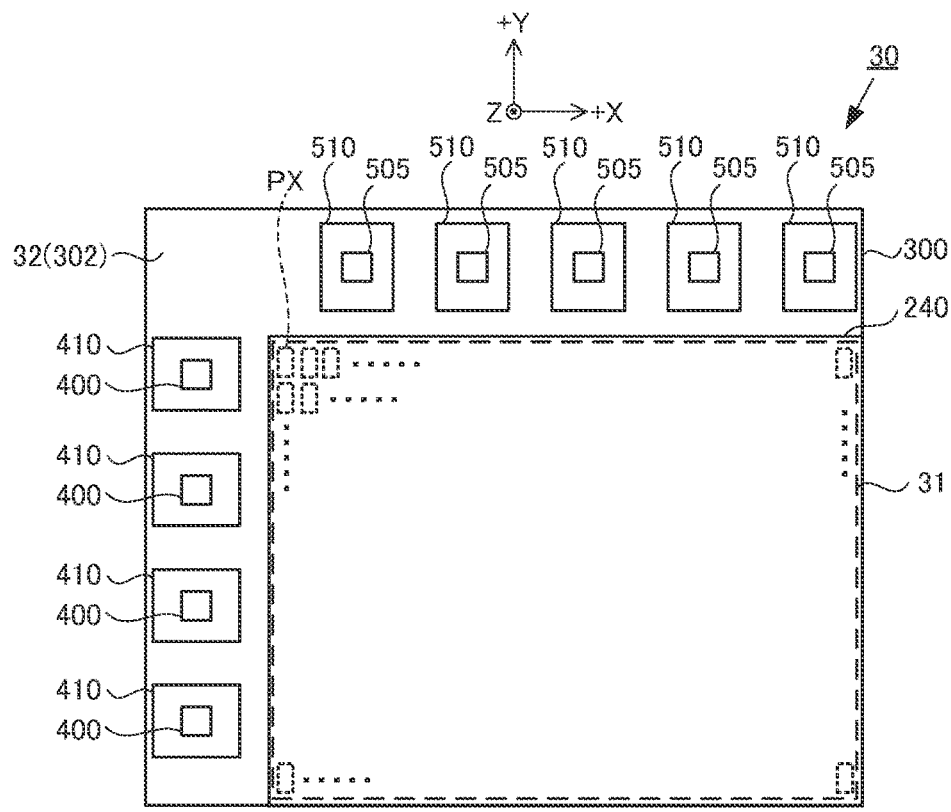
FIG. 18 is a plan view illustrating an imaging device according to Embodiment 6.

In one example, the imaging device 30 captures an X-ray image. As illustrated in FIG. 18, the imaging device 30 includes a scintillator substrate 240, an active matrix substrate 300, gate driver ICs 400, and data reading ICs 505. Additionally, the imaging device 30 includes a drive circuit, an image processing circuit, and the like (not illustrated in the drawings).

The imaging device 30 includes an imaging region 31 that is capable of capturing the X-ray image, and a frame region 32 surrounding the imaging region 31. A plurality of pixels PX is arranged in a matrix in the imaging region 31. The gate driver ICs 400 and the data reading ICs 505 are mounted in the frame region 32. As in Embodiment 1, the frame region 32 is formed from the frame region 302 of the active matrix substrate 300.

The scintillator substrate 240 of the imaging device 30 is positioned on the +Z side (imaging target side), and opposes the active matrix substrate 300. The scintillator substrate 240 is adhered to the active matrix substrate 300 by a non-illustrated seal material. The scintillator substrate 240 is a glass substrate or a resin film. A scintillator layer is formed on a surface, of the scintillator substrate 240, opposing the active matrix substrate 300. The scintillator layer is formed from a fluorescent material, and converts X-rays to visible light. The scintillator substrate 240 functions as a scintillator.

The active matrix substrate 300 of the imaging device 30 is positioned on the −Z side, and opposes the scintillator substrate 240. In one example, the active matrix substrate 300 is implemented as a glass substrate.

Figure 19:
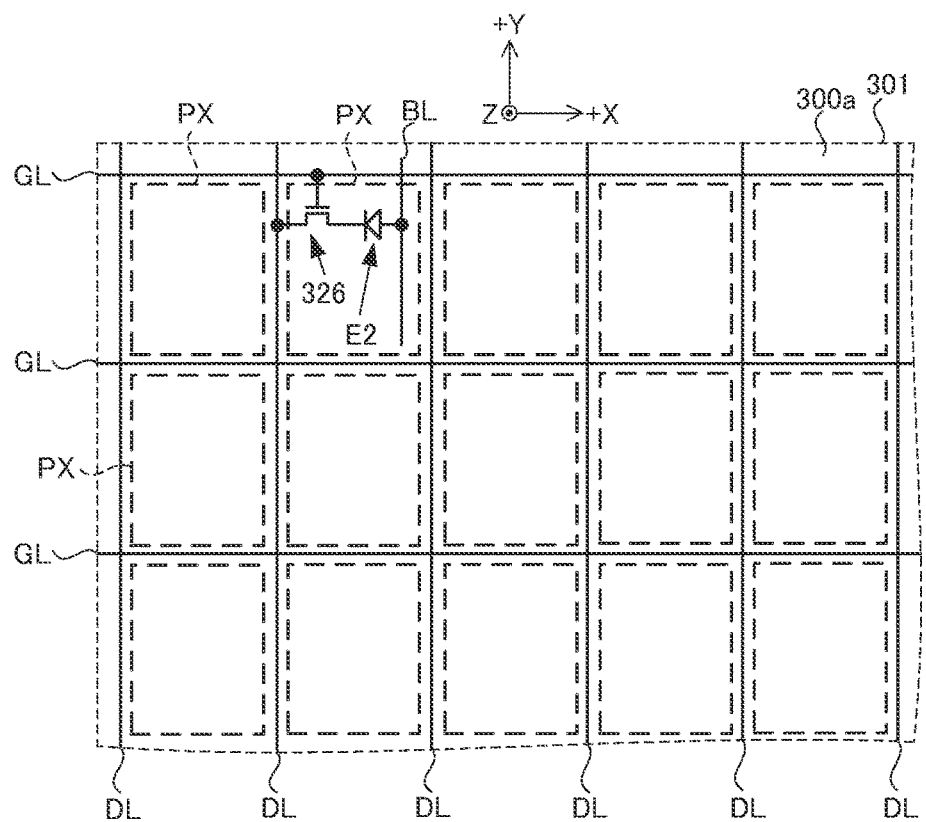
FIG. 19 is a plan view illustrating an imaging region of the active matrix substrate according to Embodiment 5.

As illustrated in FIG. 19, switching elements 326, photoelectric conversion elements E2, gate lines GL, and data lines DL are provided in the imaging region 301 (the surface 300a) of the active matrix substrate 300. In one example, the photoelectric conversion elements E2 are implemented as photodiodes.

The configurations of the gate lines GL and the data lines DL are the same as the configurations of the gate lines GL and the data lines DL of Embodiment 1. In the present embodiment, the gate lines GL and the data lines DL surround the switching elements 326 and the photoelectric conversion elements E2 that form the pixels PX.

In one example, the switching elements 326 are implemented as TFT elements. A gate electrode of each of the switching elements 326 connects to a gate line GL. A source electrode of each of the switching elements 326 connects to a hereinafter described first electrode 612 (cathode terminal of the photodiode). A drain electrode of each of the switching elements 326 connects to a data line DL. In the present embodiment, the first electrode 612 corresponds to a pixel electrode.

The photoelectric conversion elements E2 of the present embodiment are implemented as PIN photodiodes. The photoelectric conversion elements (the PIN photodiodes) E2 accumulate signal charges in accordance with an amount of visible light converted from the X-rays by the scintillator substrate 240.

Figure 20:
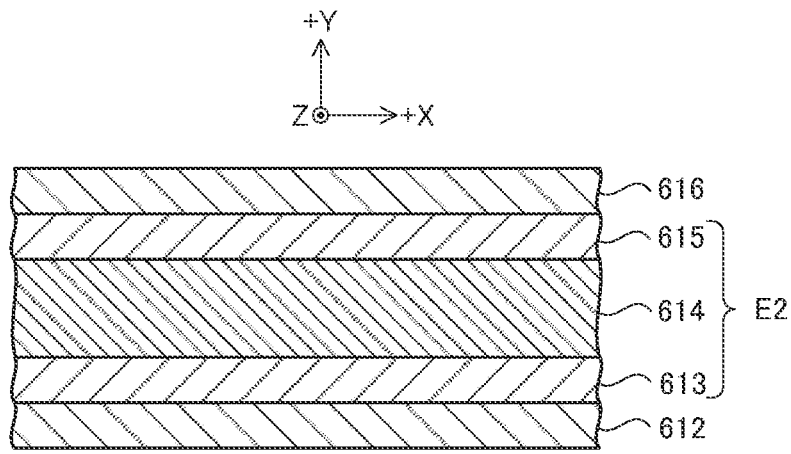
FIG. 20 is a cross-sectional view illustrating a photoelectric conversion element according to Embodiment 5.

As illustrated in FIG. 20, each of the photoelectric conversion elements E2 includes an n-type amorphous silicon layer 613, an intrinsic amorphous silicon layer 614, and a p-type amorphous silicon layer 615. The n-type amorphous silicon layer 613 is formed on the first electrode 612. The intrinsic amorphous silicon layer 614 is formed on the n-type amorphous silicon layer 613. The p-type amorphous silicon layer 615 is formed on the intrinsic amorphous silicon layer 614. Additionally, a second electrode (anode terminal) 616 is formed on the p-type amorphous silicon layer 615. The second electrode 616 is connected to a bias line BL that supplies bias voltage. Note that the first electrode 612 is formed from chrome (Cr), molybdenum, aluminum, or the like, and the second electrode 616 is formed from ITO.

As in Embodiment 1, gate terminals 330, data terminals 340, gate connection lines 335, and data connection lines 345 are provided in the frame region 302 (the surface 300a) of the active matrix substrate 300. The configurations of the gate terminals 330 and the data terminals 340 are the same as in Embodiment 1 (FIGS. 3 and 5). In the present embodiment as well, the gate terminals 330 are arranged in a direction that is perpendicular to the arrangement direction of the gate lines GL. The data terminals 340 are arranged in a direction that is perpendicular to the data lines DL. The gate terminals 330 and the gate lines GL are connected to each other by the gate connection lines 335. The data terminals 340 and the data lines DL are connected to each other by the data connection lines 345.

The gate driver ICs 400 of the imaging device 30 sequentially set the switching elements 326 connected to the gate lines GL to the open state by sequentially supplying scanning signals to the gate lines GL on the basis of signals from the drive circuit. As with the gate driver ICs 400 of Embodiment 1, each of the gate driver ICs 400 is connected to the gate terminals 330 via a flexible substrate 410.

The data reading ICs 505 of the imaging device 30 read out the accumulated signal charges to the photoelectric conversion elements E2 via the data lines DL. The data reading ICs 505 output, to the image processing circuit, voltage values corresponding to the read-out signal charges. As with the data driver ICs 500 of Embodiment 1, each of the data reading ICs 505 is connected to the data terminals 340 via a flexible substrate 510.

Next, the reading out of the signal charge is described. The anode terminal of each of the photoelectric conversion elements E2 is connected to the bias line BL, and a bias potential is applied to the anode terminal of the photoelectric conversion element E2. Meanwhile, a reference potential is applied to the data lines DL. Accordingly, when the switching element 326 assumes the open state, the photoelectric conversion element E2 is charged by the differential voltage between the bias potential and the reference potential. In the present embodiment, the differential voltage is set to reverse bias voltage in which a cathode potential is higher than an anode potential. The charge needed to recharge the photoelectric conversion element E2 to the reverse bias voltage is dependent on the amount of visible light emitted on the photoelectric conversion element E2. The data reading IC 505 reads out the signal charge by integrating the current that flows when the photoelectric conversion element E2 is recharged to reverse bias.

The imaging device 30 reads out the signal charge, that is accumulated in each of the photoelectric conversion elements E2 in accordance with the emission amount of the X-rays (the amount of visible light converted from the X-rays), by setting the switching element 326 to the open state. The imaging device 30 captures the X-ray image by reading out, from each of the pixels PX, the signal charge accumulated in the photoelectric conversion element E2.

Thus, the active matrix substrate 300 of the present embodiment is used in the imaging device 30.

Modified Examples

Embodiments have been described, but various modifications can be made to the present disclosure without departing from the spirit and scope of the present disclosure.

The components to be connected to the terminals (the gate terminals 330, the data terminals 340) are not limited to the flexible substrates 410, 510. For example, a configuration is possible in which the gate driver ICs 400 are directly connected to the gate terminals 330.

In Embodiment 1, the pixel electrodes 310, the switching elements 320, and the common electrodes are provided on the active matrix substrate 300. However, a configuration is possible in which the common electrodes are not provided on the active matrix substrate 300. For example, when the liquid crystal display panel 100 operates in twisted nematic (TN) mode, the common electrodes are provided on the counter substrate 200.

With the active matrix substrate 300 of Embodiment 2, the arrangement directions of the terminals and the arrangement directions of the pixel lines differ. With the active matrix substrate 300 of Embodiment 5 and Embodiment 6 as well, it is sufficient that the arrangement directions of the terminals and the arrangement directions of the pixel lines differ.

In Embodiment 3, the arrangement directions of the terminals and the curve axis BD of the active matrix substrate 300 are parallel to each other. It is sufficient that the arrangement directions of the terminals and the curve axis BD of the active matrix substrate 300 are not perpendicular to each other when viewed from above. As a result, the stress, caused by the curving of the active matrix substrate 300, applied to the terminals and the flexible substrates 410, 510 can be relaxed.

The self-luminous display device 20 of Embodiment 5 is an OLED display device, but the self-luminous display device 20 is not limited to an OLED display device. For example, a configuration is possible in which the self-luminous display device 20 is a micro light emitting diode (LED) display device. When the self-luminous display device 20 is a micro LED display device, an LED chip is provided on each of the pixel electrodes 602 of the active matrix substrate 300 as the self-luminator 604.

The imaging device 30 of Embodiment 5 captures X-ray images, but the images captured by the imaging device 30 are not limited to X-ray images. For example, a configuration is possible in which the imaging device 30 captures visible light images.

Figure 21:
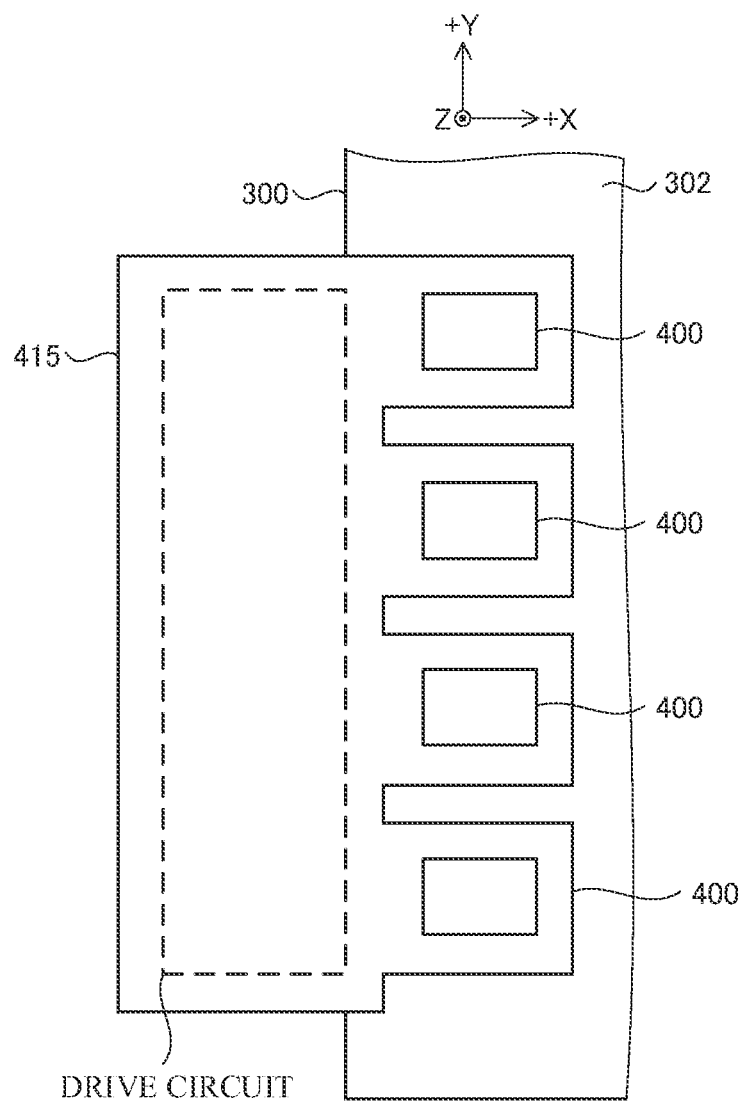
FIG. 21 is a plan view illustrating a flexible substrate according to a modified example.

In Embodiments 1 to 6, one gate driver IC 400 is mounted on one flexible substrate 410 and connected to the gate terminals 330. As illustrated in FIG. 21, a configuration is possible in which a plurality of gate driver ICs 400 are mounted on one flexible substrate 415 and connected to the gate terminals 330. As a result, the number of times of the process of mounting the gate driver ICs 400 on the active matrix substrate 300 can be reduced, and manufacturing yield can be improved. Furthermore, a configuration is possible in which the drive circuit is provided on the flexible substrate 415. Note that, to facilitate comprehension, the gate terminals 330 and the gate connection lines 335 are omitted from FIG. 21. Additionally, a configuration is possible in which, for the data driver ICs 500 and the data reading ICs 505 as well, a plurality of the data driver ICs 500 or the data reading ICs 505 is mounted on one flexible substrate.

Figure 22:
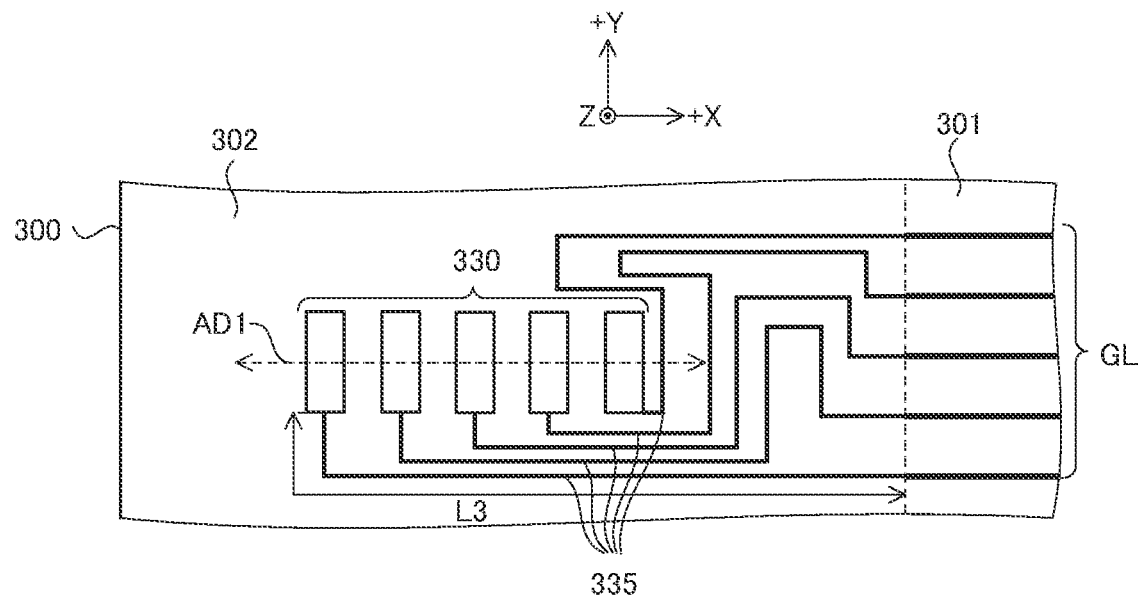
FIG. 22 is a plan view illustrating gate connection lines according to a modified example.
Figure 23:
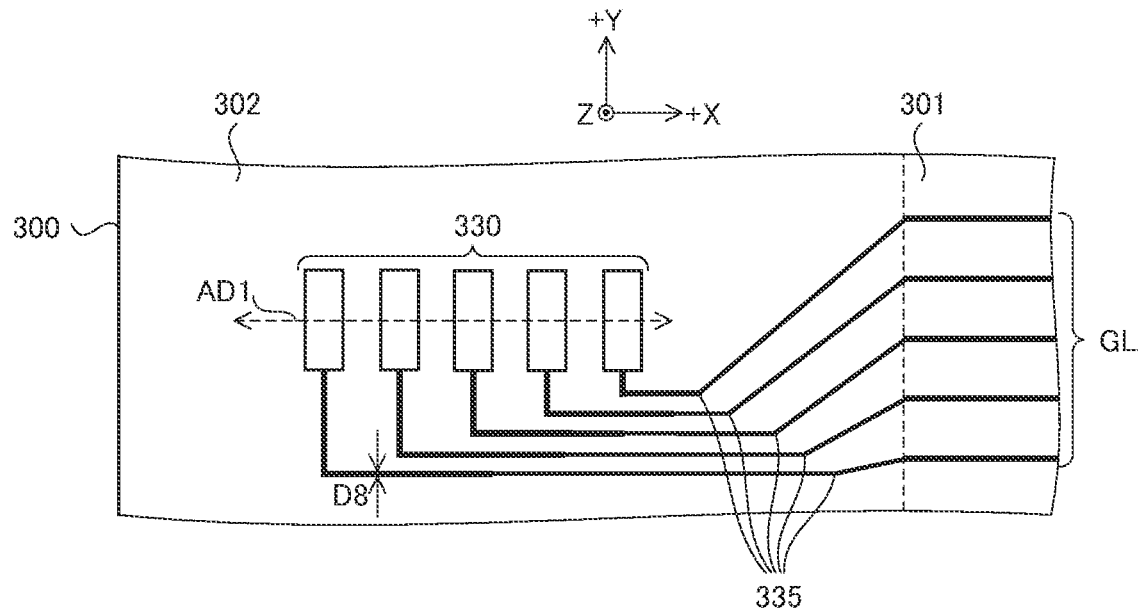
FIG. 23 is a plan view illustrating gate connection lines according to a modified example.

In the present disclosure, it is preferable that the resistance values of each of the connection lines (the gate connection lines 335 or the data connection lines 345) are equivalent. For example, as illustrated in FIG. 22, the resistance values of each of the gate connection lines 335 can be made equivalent by bending the gate connection lines 335 and making the length L3 of each of the gate connection lines 335 equivalent. Additionally, as illustrated in FIG. 23, the resistance values of each of the gate connection lines 335 can be made equivalent by adjusting a width D8 of the gate connection lines 335. In the present disclosure, the arrangement directions of the pixel lines and the arrangement directions of the terminals differ and, as such, space for adjusting the length or the width of each of the connection lines can easily be secured.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. An active matrix substrate comprising:
a plurality of pixel electrodes;
a plurality of switching elements that connect to each of the plurality of pixel electrodes;
a plurality of pixel lines that connect to each of the plurality of switching elements;
a plurality of connection lines that connect to each of the plurality of pixel lines; and
a plurality of terminals that connect to each of the plurality of connection lines, wherein
an arrangement direction of the pixel lines and an arrangement direction of the terminals differ, and
an arrangement width of the plurality of terminals is greater than an arrangement width of the plurality of pixel lines.

2. The active matrix substrate according to claim 1, wherein the arrangement direction of the pixel lines and the arrangement direction of the terminals are perpendicular to each other.

3. The active matrix substrate according to claim 1, wherein
the active matrix substrate curves around a predetermined curve axis, and
when viewed from above, the arrangement direction of the terminals and a direction of the curve axis are not perpendicular to each other.

4. The active matrix substrate according to claim 1, wherein resistance values of the plurality of connection lines are equivalent.

5. The active matrix substrate according to claim 1, wherein
a substrate having a wiring that is connected to each of the terminals is disposed at a position overlapping the plurality of connection lines, and
the substrate includes a shield that blocks noise on a surface opposing the plurality of connection lines.

6. The active matrix substrate according to claim 1, wherein
a substrate having a wiring that is connected to each of the terminals is disposed at a position overlapping the plurality of connection lines, and
a plurality of integrated circuits that connect to the wiring, and a circuit that supplies a signal to the plurality of integrated circuits are provided on the substrate.

7. A liquid crystal display device comprising:
the active matrix substrate according to claim 1;
a counter substrate opposing the active matrix substrate; and
a liquid crystal sandwiched between the active matrix substrate and the counter substrate.

8. A self-luminous display device comprising:
the active matrix substrate according to claim 1; and
a self-luminator provided on each of the pixel electrodes.

9. An imaging device comprising:
the active matrix substrate according to claim 1; and
a photoelectric conversion element provided on each of the pixel electrodes.

* * * * *